United States Patent

[11] 3,619,755

| [72] | Inventors | Ronald Verlin Munro<br>Woodland Hills;<br>Stephen R. Seccombe, Northridge; Cesar Baray, Los Angeles, all of Calif. |
|---|---|---|
| [21] | Appl. No. | 819,016 |
| [22] | Filed | Apr. 24, 1969 |
| [45] | Patented | Nov. 9, 1971 |
| [73] | Assignee | Computer Industries, Inc.<br>Sherman Oaks, Calif. |

[54] DIGITAL DRAFTING CONTROL SYSTEM
17 Claims, 7 Drawing Figs.

[52] U.S. Cl. .................................................... 318/568,
318/574, 318/603
[51] Int. Cl. .................................................... G05b 19/28
[50] Field of Search ............................................ 318/20.130,
20.132, 20.320, 20.102

[56] References Cited
UNITED STATES PATENTS

| 3,059,236 | 10/1962 | Marantette et al. .......... | 318/162 X |
| 3,386,020 | 5/1968 | Brock et al. .............. | 318/162 (20.130) |
| 3,492,552 | 1/1970 | Usami et al. .................. | 318/18 |
| 3,519,905 | 7/1970 | Little et al. .................. | 318/568 |

*Primary Examiner*—Benjamin Dobeck
*Attorney*—Jackson & Jones

ABSTRACT: A digital drafting control system adapted to control an X-Y precision plotter is disclosed. The system is responsive to digital input data defining the end coordinates of a plurality of straight line segments. The straight line segments define the graphic display desired. The control system selectively senses the position of the drawing pen and generates drive signals to X-drive and Y-drive motors associated with the X-Y plotter. The X-drive and Y-drive motors optimally drive the drafting pen in a rectilinear manner to each successive end point coordinate defined by the digital data source.

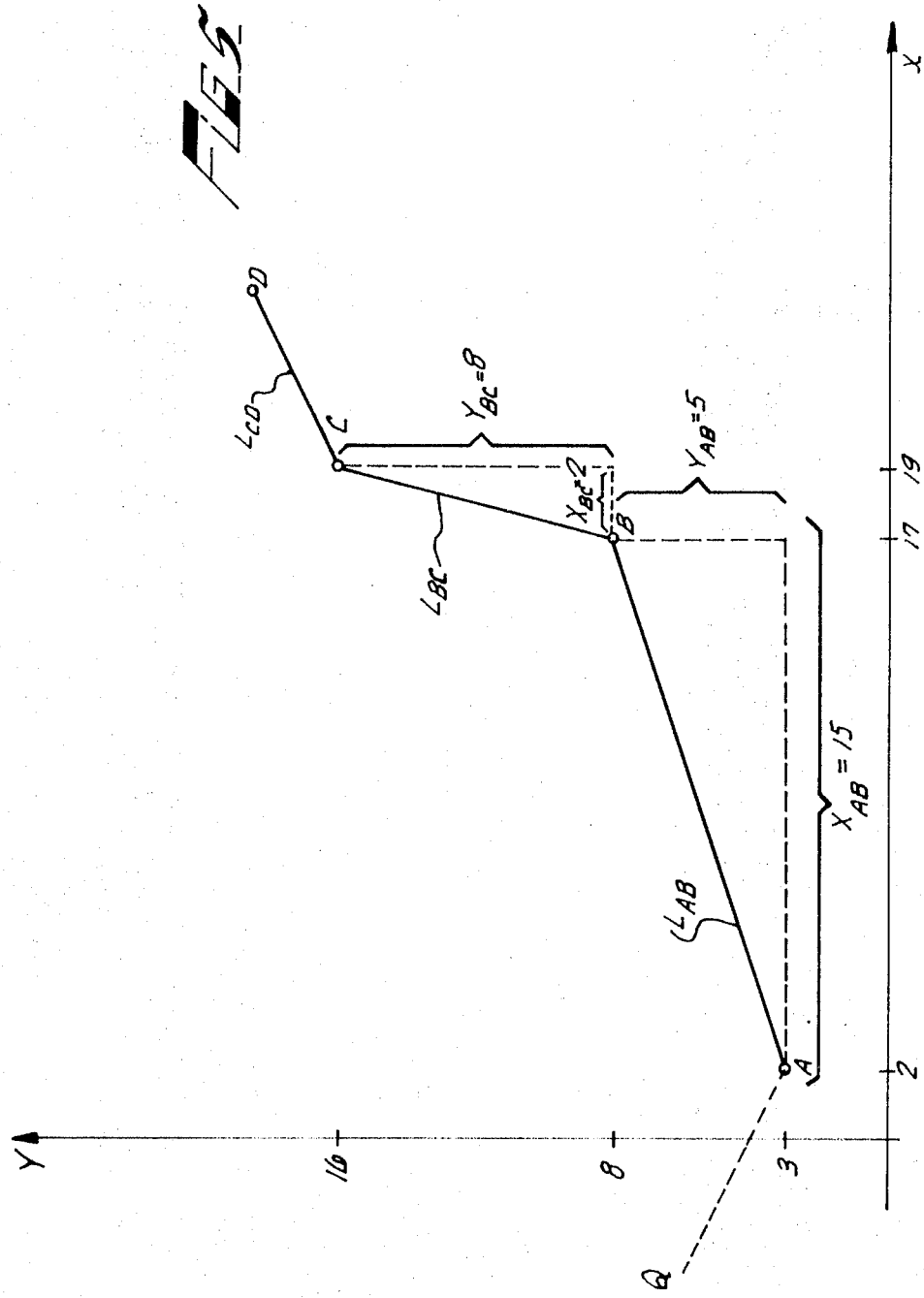

DIGITAL DRAFTING CONTROL SYSTEM

BACKGROUND OF THE INVENTION

This invention relates to precision drafting systems and more particularly to high-speed graphic display systems capable of displaying lines dictated by information supplied to the system in digital form.

The ability of computers to accept information in standard digital form suggests the attractive possibility of their utilization in performing a direct control function for controlling the operation of an automated graphic display system utilizing, for example, an X-Y plotter. The object of such a system is to utilize the digital computer's inherent high speed and extreme accuracy to both monitor and control the drawing table of such graphic display systems.

As is well known, graphic displays of any desired complexity may be represented by a plurality of straight lines of varying lengths. Any straight line is completely defined by its end coordinates. A complete graphic display may therefore be generated from input information defining only end coordinates when associated with control apparatus capable of accurately driving a writing member (such as a drawing pen) in a straight line manner between the coordinate points thus defined.

Since a digital computer accepts and operates upon information in digital form, a means must be provided to interface the computer with the controlled system so as both to convert monitored system position information into the digital format of the computer, and to convert the computer's digital output signals into a format acceptable to the controlled systems drive mechanism.

SUMMARY OF THE INVENTION

In accordance with the present invention there is provided a high-speed, high-precision closed-loop digital graphic control system. The control system is adapted to receive input information in standard digital form. The control system is responsive to the input information to provide control signals to an automatic drafting table which may, for example, comprise an X-Y precision plotter.

The input data, which is recorded on a suitable memory medium such as magnetic tape, provides a central processing unit with end coordinate information for a point to point straight line plot. The central processing unit is adapted to generate control signals which function to accurately drive the drawing pen of the X-Y plotter from point to point as defined by the input data.

The input information defining a desired display comprises a plurality of digital word groups. Each word group comprises at least three digital words. Two of the digital words of each group represent digital numbers defining the X and Y coordinates of a line end point. The third word in each group represents a pen command which directs the positioning of the drawing pen in either a "pen-up" or "pen-down" mode. The "pen-down" mode positions the pen to draw a line on the display medium. The "pen-up" mode is used when the drawing pen is merely to be driven to a new position on the display medium without actually recording such motion on the display medium.

Bidirectional incremental encoders, one each associated with each plotting axis, are positioned to accurately sense pen movement in the X and Y axial directions. The encoders are adapted to provide output pulses as a function of the magnitude and direction of pen movement in the X and Y directions. An up-down binary counter associated with each encoder keeps track of the total number of such output pulses.

The X and Y associated counter values during a given incremental time period therefore represent pen movement in the X and Y directions during the time period. A system clock defines a plurality of predetermined discrete time periods. At the end of each such time period, the output value of each counter is strobed into the central processing unit. The unit is thus provided with information in digital form representative of movement of the drawing pen in the X-Y plane of the drafting surface.

A drive-signal generating portion of the central processing unit thereafter generates X and Y digital drive signals which are converted to analog form by a pair of digital to analog converters. The analog drive signals thus derived are applied to X and Y drive motors associated with the X-Y plotter. The drive motors control the drawing pen direction, velocity and acceleration so as to optimize movement of the pen from point to point in accordance with the input data information.

A source data processor portion of the central processing unit monitors the input data at least one data point in advance. The source data processor renders the necessary calculations to immediately cause the pen to be driven to the next data point when it has been driven to within a predetermined distance of the immediately preceding data point as determined by position determining means. In this manner, the drawing pen is optimally driven from one data point to the next without the requirement of having to stop at each end point.

BRIEF DESCRIPTION OF THE DRAWING

FIG. 5 is a line segment diagram showing a typical multiline segment plot in accordance with this invention.

DESCRIPTION OF THE PREFERRED EMBODIMENT

Figure 1:
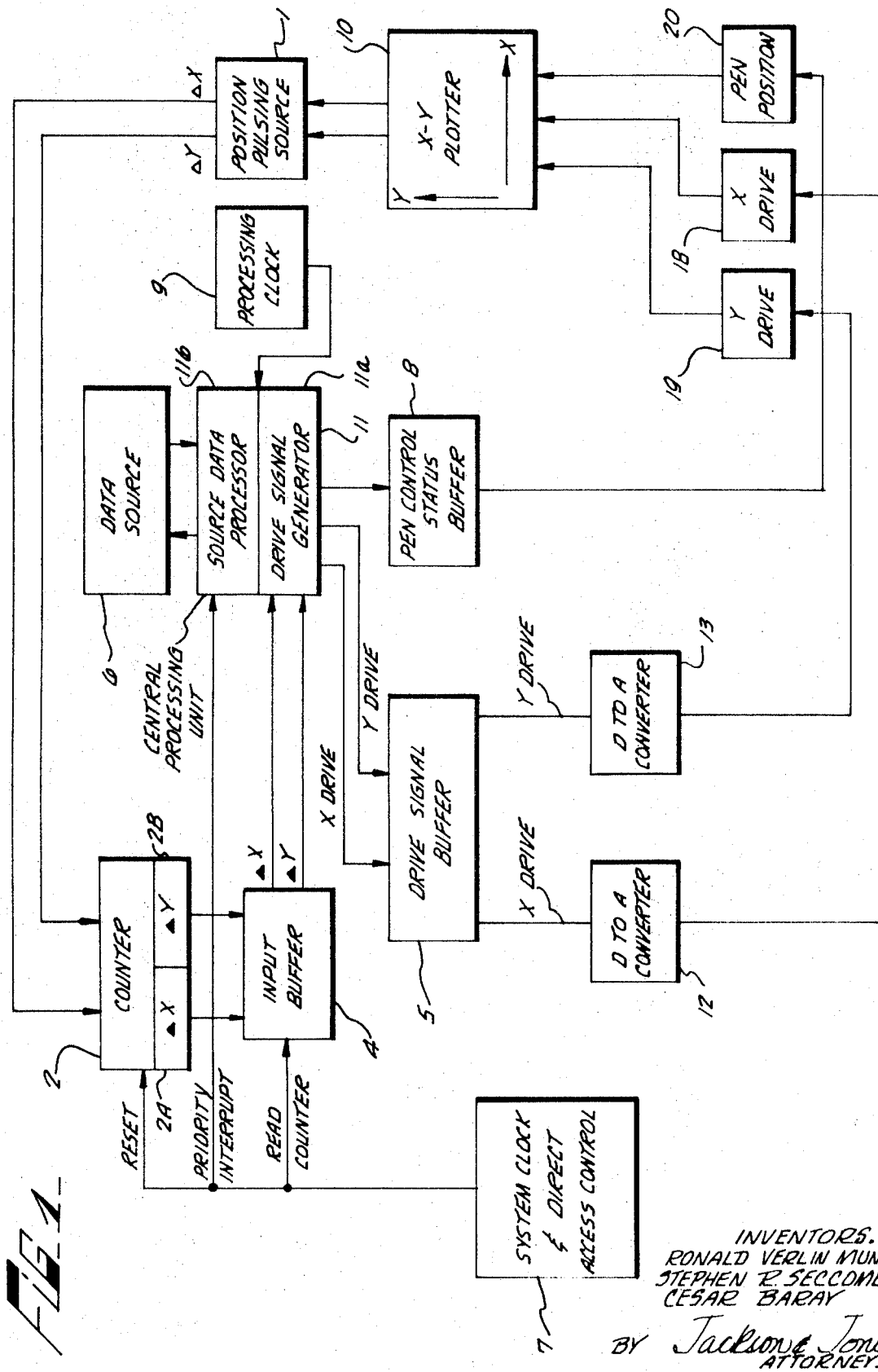
FIG. 1 depicts a block diagram of a digital drafting control system in accordance with this invention.

Turning now to the drawing of FIG. 1, there is shown a digital control system for accurately controlling an X-Y precision plotter 10. Typically, plotter 10 comprises a drafting surface upon which a pen carriage containing at least one drawing pen is mounted so as to be accurately driven in the X-Y plane. The drawing pen associated with the pen carriage may typically be selectively positioned either in or out of contact with the drafting surface by means of a pen position control 20. Pen position control 20 may be any suitable pen-positioning member of the prior art such as, for example, a solenoid which is actuatable to withdraw the pen from the drafting surface. The pen carriage is customarily controllably positioned on the plotting surface by various gear arrangements which are in turn driven by an X-drive DC motor 18 and a Y-drive DC motor 19. One suitable X-Y precision plotter is disclosed in an application entitled "Precision Plotter" by Stephen R. Seccombe forwarded on Apr. 23, 1969 and assigned to the same assignee as the present application.

A position pulsing source 1 is adapted to provide Δ X and Δ Y position pulses as a function of the movement of the pen carriage along the X and Y axes. The position-pulsing source 1 preferably includes a pair of bidirectional incremental position encoders associated one each with the X-axis and Y-axis drives. The position encoders are adapted to produce position pulses corresponding to the direction and magnitude of incremental movement of the pen carriage in the X-Y plane of the drafting surface in a manner well known in the position monitoring art.

The Δ X and Δ Y position pulses outputted by position-pulsing source 1 drive a pair of up-down binary counters 2 (comprising individual counters 2A and 2B), one each associated with the Δ X and Δ Y position pulsers respectively. Counters 2A and 2B may be any suitable up-down binary counters of the prior art. The count value in the 2A and 2B counters represent respectively pen carriage movement along the X and Y axes.

An input buffer 4 containing a pair of registers is adapted to receive the outputs from counters 2A and 2B. A system clock 7 provides a clock signal to counter 2 and input buffer 4. System clock 7 may preferably comprise a 1-kilocycle oscillator whose 1-millisecond pulses serve to define a position-sampling period in a manner hereinafter described.

Each system clock pulse serves as a read counter pulse to cause input buffer 4 to read the counter outputs into input buffer 4. The system clock pulse also serves as a reset counter pulse to reset the up-down counters 2A and 2B. Since counters 2A and 2B are reset at the start of each sampling period, the $\Delta X$ and $\Delta Y$ counts read into input buffer 4 represent pen carriage movement along the X and Y axes of the plotting surface during each 1-millisecond period defined by system clock 7.

The register values in input buffer 4 are thereafter strobed into central processing unit 11 at a time defined by system clock 7 and data processing clock 9. Processing clock 9 may be any standard oscillator of the prior art producing preferably a 1.5-microsecond clock signal.

A predetermined period after the input buffer values have been strobed into central processing unit 11, the central processing unit is interrupted and a drive signal generator portion 11a is caused to evaluate the $\Delta X$ and $\Delta Y$ pen movement signals in a manner to be hereinafter described. Drive signal generator 11a thereafter provides new X-drive and Y-drive signals to drive signal buffer 5. The drive signals thus provided are in the form of digital words defining desired X-drive and Y-drive signal levels. A pair of digital to analog converters 12 and 13, one each associated with the X-drive and Y-drive digital signals, are connected to buffer 5 to convert the digital drive signals to analog form in a conventional manner. The analog signals are provided to an X-drive motor 18 and a Y-drive motor 19 associated with X-Y plotter 10 to direct the movement of the drawing pen.

Figure 2:
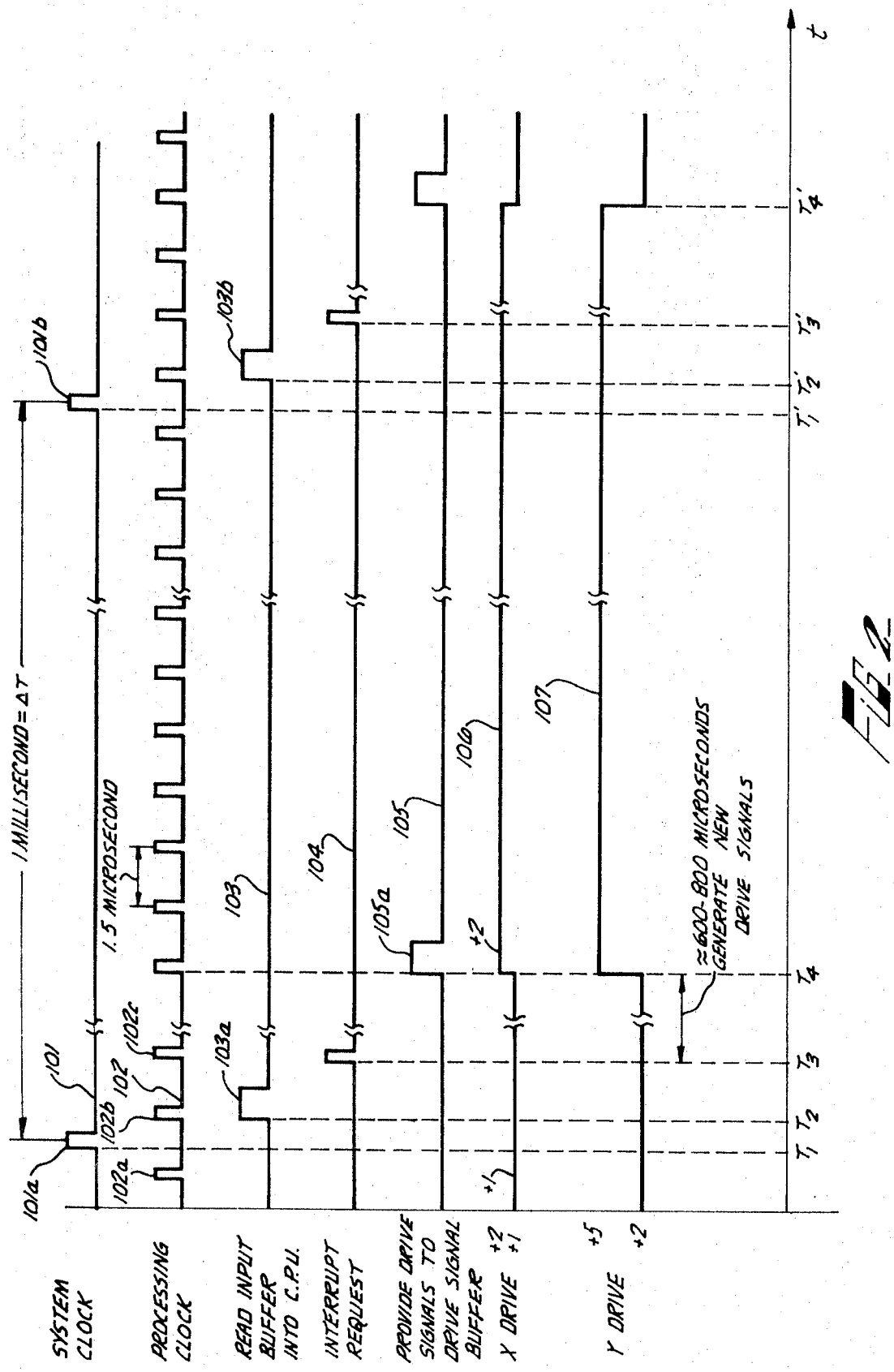
FIG. 2 is a waveform chart useful in promoting a clearer understanding of certain of the figures herein, including FIG. 1.

Reference to FIG. 2 further indicates the timing sequence for the control operation of FIG. 1 in accordance with our invention. Pulse train 101 represents the 1-millisecond system clock 7. Pulse train 102 represents the 1.5-microsecond processing clock 9. At time $T_1$ system clock pulse 101a causes counters 2A and 2B to be read into input buffer 4. Pulse 101a also serves to reset the counters 2A and 2B. At time $T_2$, corresponding to the first processing clock pulse 102b following the system clock pulse 101a, input buffer 4 is read into the central processing unit 11. At time $T_3$, corresponding to the next processing clock pulse 102c, the central processing unit 11 is interrupted and the drive signal generator 11a is caused to operate upon the $\Delta X$ and $\Delta Y$ information just inputted to generate new X- and Y-drive At time $T_4$, approximately 600 to 800 microseconds after $T_3$ (corresponding to the time required for the drive signal generator 11a to process the $\Delta X$ and $\Delta Y$ information) the central processing unit generates new X-drive and Y-drive signals. These new drive signals are read in digital form into the drive signal buffer 5. The digital drive signals thus provided are converted into analog form as previously described. The X-drive and Y-drive analog signals represented by waveforms 106 and 107 respectively in FIG. 2 are thereafter continuously applied to the X-drive and Y-drive motors 18 and 19 until the next set of drive signals are generated.

At time $T_1'$ corresponding to the next following system clock pulse 101b, the previously described sequence will be repeated leading to the provision at time $T_4'$ of new X- and Y-drive signals. The drive signals provided at time $T_4'$ are determined from the values in counters 2A and 2B at time $T_1'$. These counter values represent drawing pen movement during the time period $T_1 \rightarrow T_1'$ defined by system clock pulses 101a and 101b.

Referring again to FIG. 1, data source 6 provides central processing unit 11 with the necessary input information defining the end coordinate points of the line segments to be drawn.

Data source 6 which may as previously described be a magnetic memory tape, is selectively interrogated by central processing unit 11 to read into a source data processor portion 11b of central processing unit 11 the coordinates defining at least one line segment in advance of the current line segment being drawn. Data source 6 also provides the central processing unit 11 with pen control information defining whether a given position change shall be effected with the "pen-down" so as to have the pen movement recorded on the display medium or with the "pen-up" so that the pen will be driven to a new position without actually recording such motion on the display medium.

The "pen-up" or "pen-down" command is provided to the pen position drive 20 by a pen control status buffer 8. The CPU 11 applies the proper "pen-up" or "pen-down" command to a pen control status buffer 8 where it is available to actuate the pen position drive 20.

As previously noted, the central processing unit 11 (FIG. 1) operates upon the $\Delta X$ and $\Delta Y$ information to generate drive signals for application to the X-axis drive and Y-axis drive motors associated with the precision X-Y plotter 10. The manner in which the central processing unit operates upon the $\Delta X$ and $\Delta Y$ information to generate the proper drive signals will now be described.

Referring now to FIG. 5, assume that the X-Y plotter is being driven so as to draw a line from point A to point B which end coordinates have been previously defined by the input data source 6. Assume further, that when the plotting pen reaches point B, it is desired to have it draw a straight line from point B to point C. Before the plotting pen reaches point A (e.g. while it was being driven from a point Q), the source data processor 11b, as previously described, has interrogated the data source 6 to obtain the B coordinate information and the command directing the drawing of the line segment from A to B (i.e., "pen-down").

The source data processor 11b operates upon this coordinate information in a manner well known in the prior art to determine that it is necessary to drive the pen carriage 15 units in the positive X-direction and 5 units in the positive Y-direction to move from point A to point B. This may be appreciated by reference to FIG. 5 wherein the $X_{AB}$ and $Y_{AB}$ increments are indicated.

The technique utilized by our invention to draw a straight line from A to B involves driving the pen independently along one axis, termed the major axis, while driving the pen in a dependent or slaved manner along an orthogonal axis, termed the minor axis.

The independent or major axis is selected on the basis of which drive axis will require the most drive for a given line segment. Put in other words, if $|X_{AB}|/|Y_{AB}| \geq 1$ X is chosen to be the major axis. Conversely, if $|X_{AB}|/|Y_{AB}| < 1$ Y is chosen as the major axis. For the line segment $L_{AB}$ in FIG. 5, $|X_{AB}|/|Y_{AB}| = 15/5 = 3 > 1$. Therefore the X-axis is chosen as the major axis along which the drawing pen will be independently driven.

Once the pen has reached point A, the information relating to the slope of the line segment $L_{AB}$ and the number of X-units and Y-units to be moved to reach point B from point A is made available to the drive-signal generating system which operates upon this information in a manner to be hereinafter described to generate the proper drive signals to the Y- and X-axis drive motors.

Assume at this point that the pen is now at point A and is to be driven to point B. Point B may be referred to as the position set point; that is, the position relative to point A to which the pen must now be driven in a rectilinear manner.

Figure 3:
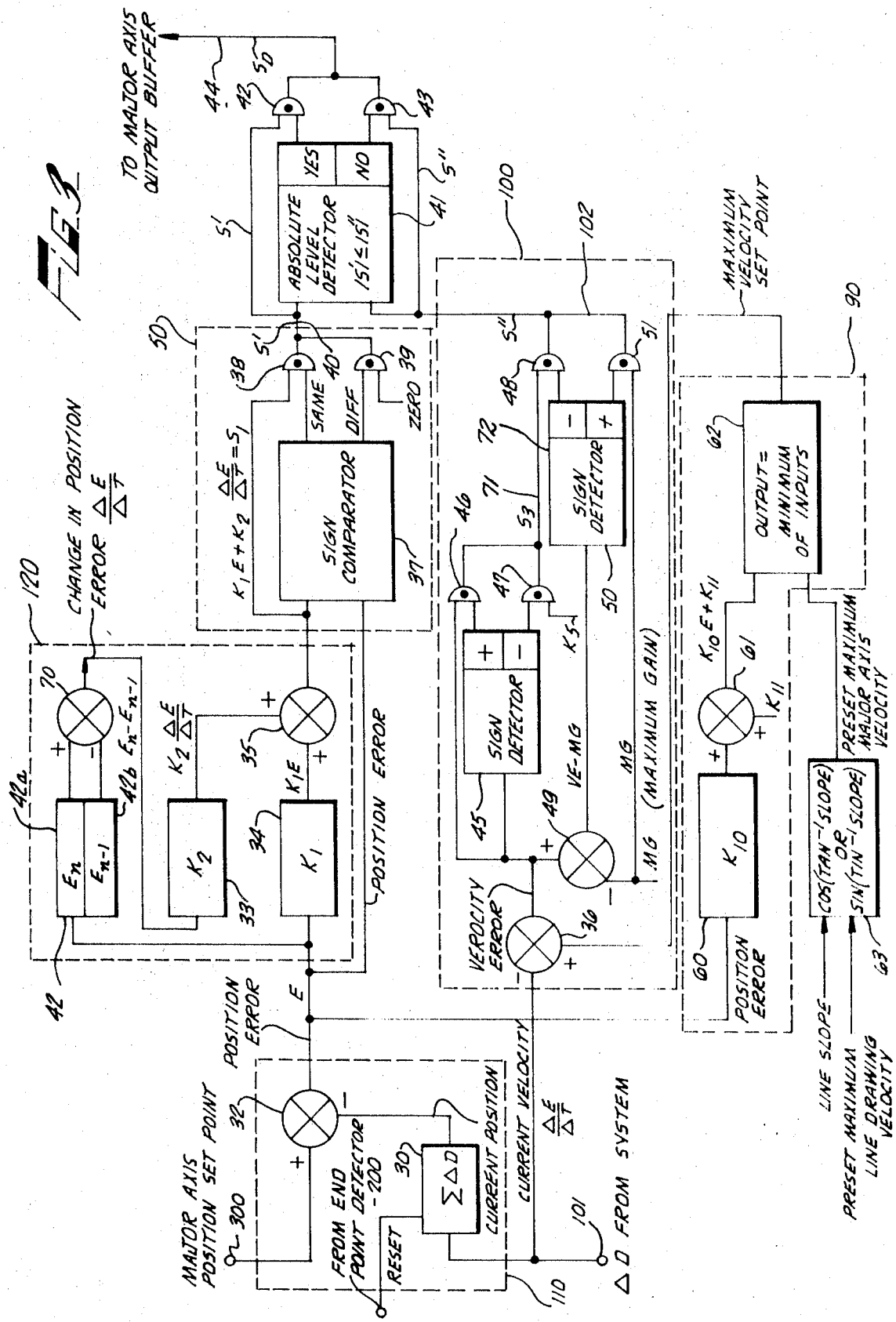
FIG. 3 is a block diagram of a major axis drive signal-producing apparatus in accordance with this invention.

Referring now to FIG. 3, there is shown the major axis drive-signal generating system of our invention. The major axis position set point corresponds to the number of units along the major axis which the drawing pen stylus must be driven to reach the major axis point B coordinate. The major axis position set point, which has been previously calculated by the source data processor 11b is made available at input 300, FIG. 3. The major axis drive signal producing system also has available at input 101 a signal $\Delta D$ which represents movement of the pen along the major axis during each sampling period as defined by system clock 7 (FIG. 1). For the case where the X-axis is the major axis $\Delta D$ corresponds to the signal $\Delta X$ from input buffer 4, FIG. 1. The signal $\Delta D$, as previously described, is a digital number which corresponds to the number of major axis incremental encoder pulses produced during a test period as defined by system clock 7.

It will be noted that for the case where the major axis is the Y-axis $\Delta D$ will correspond to the signal $\Delta Y$ from input buffer 4, FIG. 1.

The $\Delta D$ counter values are read into an integrating network 30 which totals all the $\Delta D$ values accumulated during the time the drawing pen is moving from point A to point B. Integrator 30, which may comprise a standard adding register, is reset at the start of each line segment to be drawn in a manner to be described hereinafter. The value in integrator network 30 at any given time, therefore, represents total movement along the major axis for a given line segment, in this case, the line segment $L_{AB}$, FIG. 5.

Summation network 32, as shown, subtracts the current value of integration network 30 from the major axis position set point value. The output of summation network 32, therefore, is a function of the total major axis pen movement required to reach point B less the total amount of actual movement. This value is termed the position error, E.

The position error signal E thus produced is an input into a position error and an error rate change responsive signal generator 120. Signal generator 120 produces a signal which varies as a function of the total current position error and the current rate of error change. Signal producer 120 comprises a storage register pair 42 consisting of a storage register 42a and a storage register 42b. The current position error at each sampling time $I_n$ defined by system clock 7, FIG. 1, is read into storage register 42a. The position error from the previous sampling time $T_{n11}$ is shifted from register 42a to register 42b. The position error for a given sampling time $E_n$ is compared with the position error of the immediately preceding sampling time $E_{n11}$ by summation network 70 which produces an output signal indicative of the change in position error experienced during the period defined by the two immediately preceding sampling times. The change in position error signal $\Delta E/\Delta T$ is thereafter multiplied by a constant $K_2$ in multiplication network 33 which produces an output signal equal to $K_2(\Delta E/\Delta T)$.

The position error and error rate change responsive signal generator 120 also multiplies the position error signal E by a constant $K_1$ in multiplication network 34. The output of multiplication network 34 is thereafter summed with the output from multiplication network 33 in summation network 35 which produces as an output a signal of the form $K_1E+K_2(\Delta E/\Delta T)=S_1$. It can be seen that signal $S_1$ is a function both of the total current position error E and the current rate of change of position error $\Delta E/\Delta T$. The constant $K_1$ is an error restoring constant which serves to affect the value of signal $S_1$ depending upon the total remaining position error E. The constant $K_2$ is a damping constant since it serves the function of reducing the overall value of signal $S_1$ as the rate of change of error increases. This may be understood from an appreciation that the term $\Delta E/\Delta T$ in general will have a sign opposite from that of the signal E.

A coast determinator 50 receives signal $S_1$ and the position error signal E and outputs either $S_1$ or a "zero" level signal as a function of the current position and velocity of the pen. Coast determinator 50 comprises a sign comparator 37 which compares the respective signs of signal $S_1$ and the position error signal E. If the signs are the same, sign comparator 37 provides an output to an AND-gate 38 which, thus enabled, outputs $S_1$ on line 40. If the compared signs are different, sign comparator 37 provides an output to an AND-gate 39 which, thus enabled, outputs a "zero" level signal on line 40. It will be appreciated that of AND-gates 38 and 39 only one will be enabled at a given time. The signal appearing on line 40, which consists of either signal $S_1$ or a "zero" level signal is termed signal $S'$.

Coast determinator 50 serves the function of prohibiting a reverse drive signal when the position set point is approached. The pen is thereafter allowed to "coast" into the position set point B (under zero drive). This function may be understood from an appreciation that the $K_1E$ component of the signal $S_1$ has the same sign as the position error E. The signal $S_1$, therefore, will have a sign different from position error signal E only when the $K_2(\Delta E/\Delta T)$ term is larger than $K_1E$ term indicating that the total position error is small in relation to the current velocity.

The signal $S'$, therefore, is an overall function of the position error and the rate of change of position error or velocity. The value of the constants $K_1$ and $K_2$ are chosen in accordance with standard servocontrol techniques to properly "tune" the system response.

In addition to a position and velocity responsive signal, the major axis drive-signal generating system is adapted to generate an acceleration responsive signal. The acceleration responsive signal is determined as a function of several system parameters hereinafter described, including the maximum major axis velocity desired.

The preset maximum major axis velocity is determined by computation network 63. Computation network 63 receives as inputs the slope of the line being drawn (slope of $L_{AB}$) and the present maximum line drawn velocity desired. The slope of each line segment is readily determined from the end point coordinate information supplied by data source 6. The slope of $L_{AB}$ (FIG. 5), for example, is determined from the equation Slope $L_{AB}=(Y_{AB}/X_{AB}=5/15 =1/3$. The preset maximum line drawn velocity is determined as a function of the physical characteristics of the controlled X-Y plotter. For example, the maximum rate of ink feed to the drafting pen may provide an upper limit to the feasible maximum line drawing rate.

Computation network 63 provides as an output a signal whose value is equal to the product of the preset maximum line-drawing velocity and the cosine or the sine of the angle whose tangent is the slope of the line to be drawn depending upon whether the X- or the Y-axis respectively is the major axis. The signal output from computation network 63 therefore represents the preset maximum major axis velocity desired.

The preset maximum major axis velocity serves as an input to a maximum velocity set point determinator 90. Determinator 90 also has as an input thereto the position error signal E from summation network 32. Position error E is multiplied by a constant $K_{10}$ in multiplication network 60. The output of multiplication network 60 is applied to summation network 61. Summation network 61 also has a constant $K_{11}$ as an input. The output of summation network 61 is a signal of the form $K_{10}E+K_{11}$. The constant $K_{10}$ is the slope of a ramp velocity characteristic. The constant $K_{11}$ is the minimum velocity to which the ramp velocity characteristic is clamped.

The output of summation networks 61 and the preset maximum major axis velocity are fed as inputs to a minimum level determinator 62. Level determinator 62 has as an output the minimum of the signal inputs. Therefore, if the value of $K_{10}E+K_{11}$ is less than the preset maximum major axis velocity, determinator 62 will output a signal of the value $K_{10}E+K_{11}$. If the value of $K_{10}E+K_{11}$ is greater than the preset maximum major axis velocity, determinator 62 will output the predetermined maximum major axis velocity signal. The output of determinator 62 is termed the maximum velocity set point.

It will be appreciated that the maximum velocity set point is a function of the position error E. If the value of E is large, the maximum velocity set point is set at the value corresponding to the preset maximum major axis velocity desired. As the value of E diminishes (as the pen approaches the position set point) the maximum velocity set point is reduced in accordance with the function $K_{10}E+K_{11}$.

The maximum velocity set point signal is inputted into a differential velocity signal generator 100. Generator 100 also has as an input the current velocity. The current velocity may be represented simply by $\Delta D$. That $\Delta D$ represents the current pen velocity may be understood from an appreciation that $\Delta D$ (the incremental position change along the major axis) is determined at the end of each 1 millisecond period ($\Delta T$) as defined by system clock 7. Total movement during the time $\Delta T$, therefore, inherently represents the current velocity $\Delta D/\Delta T$.

The current pen velocity $\Delta D/\Delta T$ is subtracted from the maximum velocity set point by a summing network 36. The output of summing network 36 is termed the velocity error. The velocity error is simply the difference between the maximum pen velocity desired at a given point along a given line segment and the actual pen velocity at that point.

A sign detector 45 determines the sign of the velocity error signal. If the sign of the velocity error is positive, indicating that the current velocity is less than the maximum velocity set point, sign detector 45 provides an output to enable an AND-gate 46. AND-gate 46 when thus enabled outputs the velocity error signal. If the sign of the velocity error is negative, indicating that the current velocity is greater than the maximum velocity set point, sign detector 45 outputs a signal to enable an AND-gate 47. AND-gate 47 when thus enabled outputs a constant $K_5$. The constant $K_5$ represents the minimum value to which the drive signal will be reduced when the pen is at a high velocity. It is clear that only one of the AND-gates 46 or 47 will be enabled at a given time. The output on line 101 will therefore be the signal $K_5$ or the velocity error signal. The signal on line 71 will be referred to as $S_3$.

The velocity error signal derived from summation network 36 is also applied to summation network 49. Summation network 49 has as a second input a maximum predetermined allowable gain signal MG. The value of MG is determined as a function of the X-Y plotter and drive motors. It represents the maximum acceleration which the system can experience. Summation network 49 subtracts the signal MG from the velocity error signal (VE) and inputs the signal thus derived to a sign detector 72.

If VE-MG is positive, indicating that the velocity error was larger than the maximum predetermined allowable gain, sign detector 50 outputs a signal which enables an AND-gate 51. AND-gate 51 has as a second input the signal MG which it provides to line 102 when thus enabled. If VE-MG is negative, indicating that the velocity error is less than the maximum allowable gain, sign detector 50 outputs a signal which enables an AND-gate 48. AND-gate 48 has as a second input thereto the signal $S_3$ which is outputted on line 102 when AND-gate 48 is thus enabled. It is clear that only one of AND-gates 51 or 48 will be enabled at a given time. The output on line 102 is termed $S''$.

$S''$ is the output of differential velocity signal generator 100. It represents the optimum velocity correction signal and is a function of the error signal E, the current pen velocity $\Delta D/\Delta T$, and the various characteristics of the X-Y plotter and associated drive motors.

An absolute level detector 41 receives as inputs $S'$ and $S''$. Level detector 41 compares the absolute value of $S'(|S'|)$ to the absolute value of $S''(|S''|)$. If $|S'| \leq |S''|$ level detector 41 outputs a signal to enable an AND-gate 42. AND-gate 42 has as a second input thereto the signal $S'$. AND-gate 42 outputs $S'$ to line 44 when thus enabled. If $|S'| > |S''|$ level detector 41 outputs a signal to enable an AND-gate 43. AND-gate 43 has as a second input thereto the signal $S''$. When thus enabled, AND-gate 43 provides $S''$ as an output to line 44. It is clear that only one of the two AND-gates 42 or 43 will be enabled at a given time.

The signal on line 44 is the drive signal ($S_D$) and is provided to a major axis portion of the output buffer 5 (FIG. 1). The drive-signal generating system hereinabove described is capable of accurately and rapidly generating a major axis drive signal taking into account the length of the line segment to be drawn, the current position of the drawing pen, the current velocity of the pen, table parameters such as the maximum desirable line-drawing velocity and other factors. The drive signal thus generated is applied to the major axis drive motor 18 or 19 whereby the drawing pen will be driven at maximum efficiency along the major axis.

Figure 4A:
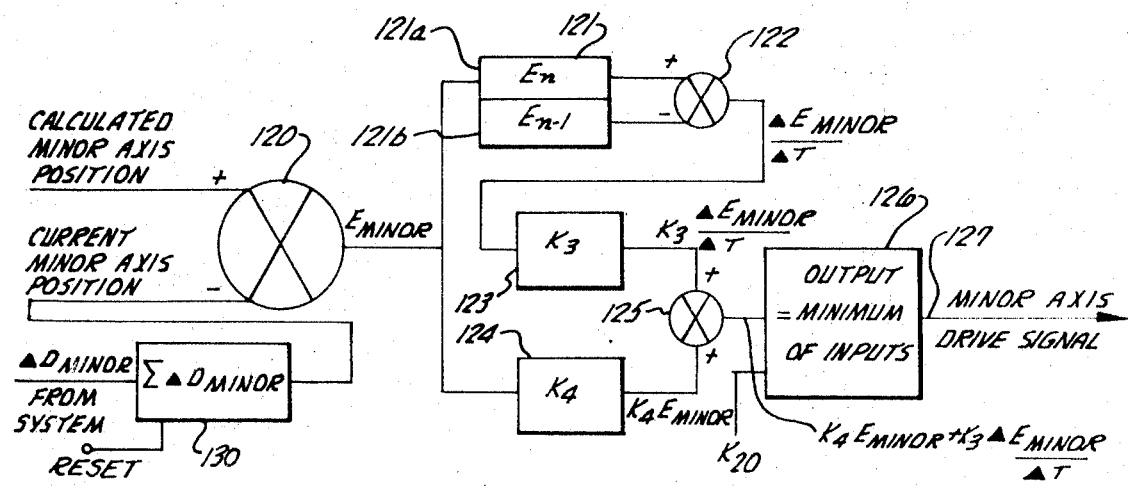
FIG. 4A is a block diagram of a minor axis drive signal-producing apparatus in accordance with this invention.
Figure 4B:
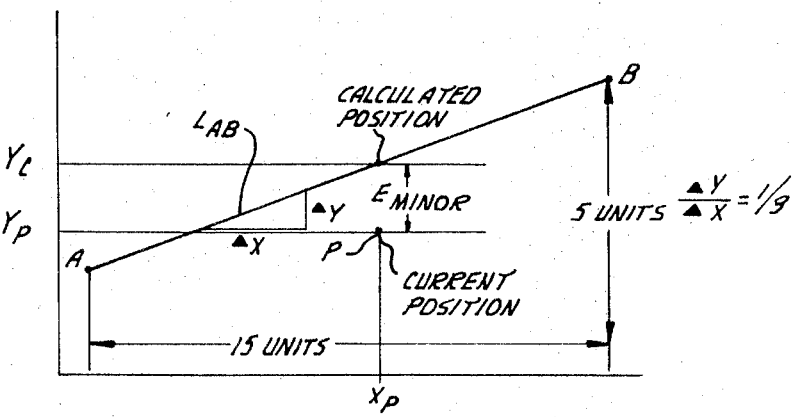
FIG. 4B is a line segment diagram useful in promoting a clear understanding of the system of FIG. 4A.

Referring now to FIGS. 4A and 4B, the technique of our invention for generating the minor axis drive signal is illustrated. In FIG. 4B the line segment $L_{AB}$ of FIG. 5 is indicated. Assume that the drawing pen is now at point P. Point P has been purposely shown a distorted distance away from line AB for purposes of illustration. For the major axis position $X_p$ corresponding to point P, the difference between $Y_p$ (the current Y-axis position of point P) and $Y_c$ (the calculatable ordinate on $L_{AB}$ corresponding to point $X_p$) is termed the current minor axis error $E_{minor}$.

It is clear that the minor axis line position, in this case the Y-axis line position, for any given major axis point may be readily calculated in a known manner, not shown, from the known coordinates of points A and B.

Referring now to FIG. 4A, the minor axis drive-signal generating system is shown. A summing network 120 has as inputs thereto the current minor axis position and the calculated minor axis position. The current minor axis position is obtained from an integrator 130 in a manner similar to the operation of the integrator 30 of FIG. 3. For the case where the X-axis is the major axis $\Delta D_{minor}$ corresponds to the signal $\Delta Y$ from input buffer 4, FIG. 1. The output from summing network 120 is the minor axis error signal $E_{minor}$.

The minor axis error signal thus obtained is inputted into shift register 121a of shift register pair 121 which is comprised of shift register 121a and shift register 121b. Shift register pair 121 functions in a manner similar to shift register pair 42 of FIG. 3 and outputs to summing network 122 the value of the current minor axis position error and the minor axis position error from the previous sampling time. This value $\Delta E_{minor}/\Delta T$ is multiplied in multiplying network 123 which has as an output a signal equal to $K_3 (\Delta E_{minor}/\Delta T)$. A second multiplying network $K_4$ receives as an input the current minor axis error $E_{minor}$ and multiplies it by a constant $K_4$, outputting a signal equal to $K_4 E_{minor}$. The outputs from multiplying networks 123 and 124 are thereafter summed in summing network 125 which outputs a signal of the form $K_3 (\Delta E_{minor}/\Delta T + K_4 E_{minor}$. It will be appreciated that the output from summing network 125 is analogous in form to the output from summing network 35 of FIG. 3. The constants $K_4$ and $K_3$ are analogous to the tuning constants $K_1$ and $K_2$ of FIG. 3.

The output from summing network 125 is fed to a minimum level detector 126. Detector 126 has as a second input thereto a constant $K_{20}$. Constant $K_{20}$ is a signal which corresponds to the maximum predetermined minor axis drive desired. Minimum level detector 126 outputs on line 127 the minimum of the two inputs. The output of detector 126 constitutes the minor axis drive signal and is applied to the minor axis register in signal buffer 5, FIG. 1.

The major axis and minor axis drive-signal producing systems of FIGS. 3 and 4A are uniquely adapted to generate drive signals which assure that the X-Y plotter draws a continuously smooth straight line between the end coordinate points defined by the input data source 6.

Since the graphic display technique of our invention involves moving the drawing pen from point to point as defined by the input data source 6, it is necessary to have a means for detecting when an end point coordinate has been "reached" whereby the pen may be caused to be driven to the next data defined end coordinate point.

Figure 6:
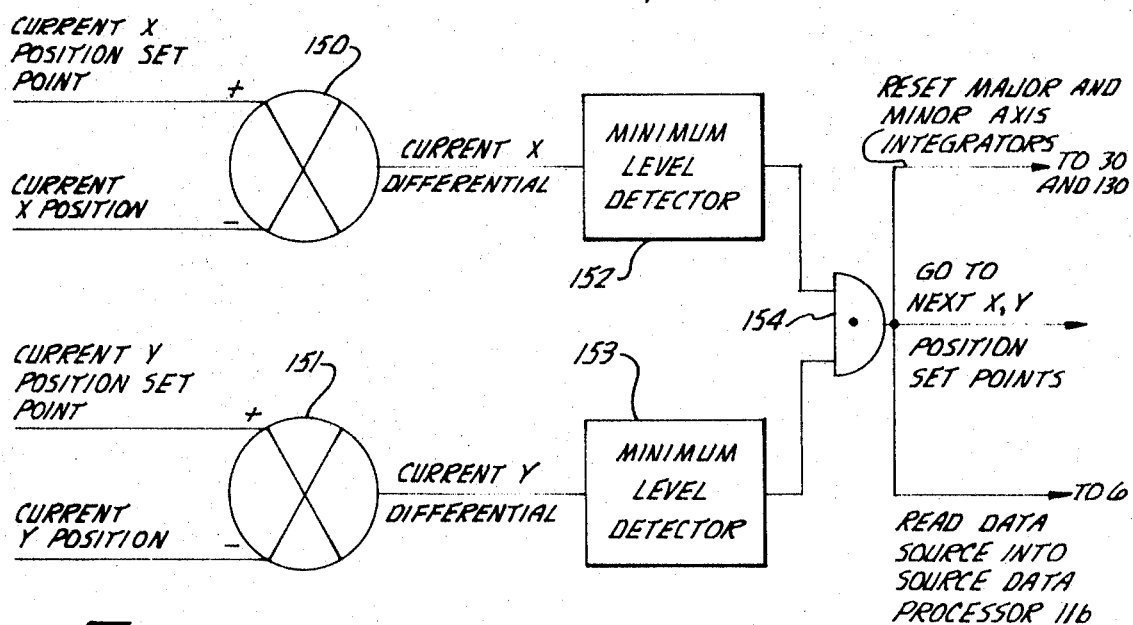
FIG. 6 is a block diagram of the end point detection system in accordance with this invention.

Referring now to FIG. 6, the end point detection scheme of our invention is illustrated. Shown in FIG. 6 are two summing networks 150 and 151. Summing network 150 has as inputs thereto the current X position set point and the current X position. The current X position is obtained from either integrator 30, FIG. 3, or integrator 130, FIG. 4A, depending upon whether the X-axis is the major or minor axis for a given line segment. Summing network 150 has as an output the difference between the current X position set point and the current X position. This signal is termed the current X-differential.

Summing network 151 has as inputs thereto the current Y position set point and the current Y position. The current Y position is similarly obtained from either integrator 30 or integrator 130 depending upon whether the Y-axis is the major or minor axis for a given line segment. The output of summing network 151 is the current Y position set point less the current Y position which is termed the current Y-differential.

The current X-differential and the current Y-differential respectively indicate the total remaining distance between the current position of the pen along the X- and Y-axis axis and the position set point or the end point position to which the pen is to be driven along the X- and the Y-axis for a give line segment. Minimum level detector 152 receives the outputs from summing network 150. Minimum level detector 153 receives the output from summing network 153. If the output from a summing network is below a predetermined level, its associated minimum level detector will provide an output to AND-gate 154. When both the current X-differential and current Y-differential are below their associated predetermined minimum levels indicating that the current position of the pen is within a predetermined distance of the position set point, the outputs to minimum level detectors 152 and 153 conjoin to enable AND-gate 154 to emit a command signal.

The command signal output from gate 154 is operative to perform the following functions: The command signal directs the source data processor 11b to provide the drive signal generator 11a with the next position set point values as previously defined by data source 6. The next position set point corresponds to point C, FIG. 5, which point defines one end coordinate of line segment $L_{BC}$. At the same time the command signal is applied to reset the major and minor axis integrators 30 and 130. The values in integrators 30 and 130 will thereafter represent movement along line segment $L_{BC}$. The command signal is also used to direct the source data processor 11b to read the next following data command from data source 6 whereupon it will be processed to determine the various line characteristics of the next succeeding line segment to be drawn. The next following data command defines the end point coordinate D, FIG. 5, which point defines one end coordinate of line segment $L_{CD}$. The source data processor 11b will therefore always have available the line characteristics of at least one line in advance of the current line being drawn by the pen.

While the invention has been described with respect to several embodiments in accordance therewith, it will be apparent to those skilled in the art that various modifications and improvements may be made without departing from the spirit and scope of our invention. For example, since in the "pen-up" mode the drawing pen is driven to a new position on the display medium without actually recording such motion on the display medium, it is not necessary that the pen be driven in a rectilineal manner in such a mode. Slightly higher speed may be attained by driving both the X-axis and the Y-axis motors independently at maximum speed. It will be understood by those skilled in the art to which this invention pertains, therefore, that the scope and spirit of the appended claims should not necessarily be limited to the embodiments described.

We claim:

1. A control system for controlling the movement of the drawing pen of a plural axis plotter comprising in combination:

data means for providing coordinate digital signals corresponding to at least start and end coordinate points with respect to said plural axes;

position-sensing means for providing pen position signals representing the position of said drawing pen with respect to said plural axes;

converter means for receiving said pen position indication signals and providing corresponding digital pen position signals;

drive means responsive to applied drive signals for deflecting said drawing pen along said plural axes;

drive-signal generating means responsive to said coordinate digital signals and said digital pen position signals for providing drive signals to said drive means to deflect said drawing pen in a substantially rectilinear manner between said start and end coordinate points;

end point detection means responsive to said position-sensing means for providing an end point signal when said pen is within a predetermined distance of an end coordinate point; and means responsive to said end point signal for causing said drive-signal generating means to provide drive signals to said drive means to deflect said drawing pen in a substantially rectilinear manner towards a new end coordinate point.

2. The combination of claim 1 wherein said plotter is an X-Y plotter and wherein said position-sensing means comprises first and second bidirectional incremental encoders one each associated with the X and Y axes respective of said X-Y plotter, each encoder providing output pulses as a function of the magnitude and direction of drawing pen movement along its associated axis.

3. The combination of claim 2 wherein said converter means comprises first and second up-down binary counters for counting the output pulses of said first and second bidirectional incremental encoders respectively, whereby the count in each counter represents pen movement along each associated axis.

4. The combination of claim 3 further comprising a drive signal input buffer comprising first and second buffer registers adapted to receive the output of said first and second counters respectively for temporarily storing said digital pen position signals.

5. The combination of claim 4 further comprising a system clock for providing a repetition sequence of system clock pulses defining a succession of equal sampling periods, the contents of said first and second counters being read into said first and second buffer registers, and said first and second counters being reset in response to each system clock pulse whereby the counter values read into said first and second buffer registers represent pen movement along the X and Y axes respectively during each sampling period.

6. The combination of claim 5 further comprising a data processing clock emitting a repetitive sequence of data processing clock pulses, the repetitive rate of said data processing clock pulses being substantially higher than that of said system clock pulses, the contents of said first and second buffer registers being applied to said drive signal generating means in response to said data processing clock pulses.

7. A control system for controlling movement of the drawing pen of an X-Y plotter comprising in combination:

data means for providing coordinate digital signals corresponding to at least start and end coordinate points with respect to said plural axes;

position-sensing means for providing pen position signals representing the position of said drawing pen with respect to said plural axes, said position sensing means including first and second bidirectional incremental encoders one each associated with the X and Y axes respective of said X-Y plotter, each encoder providing output pulses as a function of the magnitude and direction of drawing pen movement along its associated axis;

converter means for receiving said pen position indication signals and providing corresponding digital pen position signals, said converter means including first and second up-down binary counters for counting the output pulses of said first and second bidirectional incremental encoders respectively, whereby the count in each counter represents pen movement along each associated axis;

a drive-signal input buffer including first and second buffer registers adapted to receive the output of said first and second counters respectively for temporarily storing said digital pen position signals;

drive means responsive to applied drive signals for deflecting said drawing pen along said plural axes;

drive-signal generating means responsive to said coordinate digital signals and said digital pen position signals for providing drive signals to said drive means to deflect said drawing pen in s substantially rectilinear manner between said start and end coordinate points;

a system clock for providing a repetition sequence of system clock pulses defining a succession of equal sampling periods, the contents of said first and second counters being read into said first and second buffer registers, and said first and second counters being reset in response to each system clock pulse whereby the counter value read into said first and second buffer registers represent pen movement along the X and Y axes respectively during each sampling period.

a data processing clock emitting a repetitive sequence of data processing clock pulses, the repetitive rate of said data processing clock pulses being substantially higher than that of said system clock pulses, the contents of said first and second buffer registers being applied to said drive-signal generating means in response to said data processing clock pulses; and computation means responsive to said coordinate digital signals for generating computed signals corresponding to the X and Y axial distances between said start and end coordinate points, the slope of the line passing through said first and second coordinate points, and the absolute value of the slope of the line passing through said start and end coordinate points, said computed signals being selectively applied to said drive-signal generator means.

8. The combination of claim 7 wherein said drive-signal generating means includes a major axis drive signal generator and a minor axis drive signal generator, the major axis being the X-axis if said absolute value of the line slope is less than 1, the major axis being the Y-axis if said absolute value of the line slope is greater than 1, the minor axis in each case being the axis other than the major axis.

9. The combination of claim 8 wherein the major axis drive-signal generator comprises:

integration means responsive to the major axis buffer register signals provided to generate a major axis position signal as a function of the sum of said provided signals; and first summation means providing a position error signal equal to the difference between the major axis distance between said start and coordinate points and said major axis position signal.

10. The combination of claim 9 wherein the major axis drive-signal generator further comprises:

a position error and error rate change signal-producing means receiving said position error signal for generating a signal of the form $$K_1 E = K_2(\Delta E/\Delta T)$$

where $K_1$ and $K_2$ are tuning constants, $E$ is the position error signal, $\Delta T$ is the sampling period defined by the system clock pulses.

11. The combination of claim 10 wherein the major axis drive-signal generator further comprises:

a coast determinator receiving the position error signal and the output of said position error and error rate change signal-producing means for providing the signal $K_1 E + K_2(\Delta E/\Delta T)$ if the sign of $K_1 E + K_2(\Delta E'/\Delta T)$ is the same as the sign of $E$, and providing a "zero" signal output if the sign of $K_1 E + K_2 \Delta E/\Delta T$ is different from the sign of $E$.

12. The combination of claim 11 wherein the major axis drive-signal generator further comprises:

means for generating a signal corresponding to a preset maximum major axis velocity desired.

13. The combination of claim 12 wherein the major axis drive-signal generator further comprises:

maximum velocity set point signal-generating means responsive to the position error signal and the maximum major axis velocity signal for providing a signal of the form $K_{10}E+K_{11}$ if $K_{10}E+K_{11}$ is less than the maximum major axis velocity signal, and for providing the maximum major axis velocity signal if $K_{10}E+K_{11}$ is greater than the maximum major axis velocity signal, where $K_{10}$ and $K_{11}$ are predetermined velocity tuning constants.

14. The combination of claim 13 wherein the major axis drive-signal generator further comprises:

differential velocity-signal generating means responsive to the difference between the signal $\Delta E/\Delta T$ and the output of said maximum velocity set point signal-generating means for generating a signal of the form:

| | |
|---|---|
| MG | if VE−MG is positive |
| $K_5$ | if VE−MG is negative and VE is negative |
| the output of said maximum velocity set point signal generating means | if VE−MG is negative and VE is positive | where MG is the maximum predetermined major axis acceleration desired, VE is equal to the output of said maximum velocity set point signal-generating means less ($\Delta E/\Delta T'K_5$ is a predetermined constant equal to the minimum high-velocity signal desired.

15. The combination of claim 14 wherein the major axis drive-signal generator further comprises:

absolute level responsive signal-generating means for generating a signal of the form $$S' \text{ if } |S'| \leq |S''|$$
$$S'' \text{ if } |S'| > |S''|$$

where $S'$ is the output from said coast determinator, $S''$ is the output from said differential velocity-signal generating means.

16. The combination of claim 8 wherein the minor axis drive-signal generator comprises:

integrator means responsive to the minor axis buffer register signals provided drive-signal a minor axis position signal as a function of the sum of said provided minor axis buffer register signals.

17. The combination of claim 16 wherein said minor axis drive signal generator further comprises:

means responsive to the minor axis position signals to generate a signal of the form $$K_4 E_{minor}+K_3(\Delta E_{minor}/\Delta T)$$

where $E_{minor}$ is the difference between the current minor axis position and the minor axis position on the line connecting said start and end coordinate points corresponding to the current major axis position, $\Delta E_{minor}/\Delta T$ is the difference between the current value of $E_{minor}$ and the value of $E_{minor}$ from the immediately preceding sampling period, and $K_4$ and $K_3$ are predetermined tuning constants.

* * * * *

PO-1050
(5/69)

UNITED STATES PATENT OFFICE
CERTIFICATE OF CORRECTION

Patent No. 3,619,755                    Dated   November 9, 1971

Inventor(s)  Ronald V. Munro, Stephen R. Seccombe, and Cesar Baray

It is certified that error appears in the above-identified patent and that said Letters Patent are hereby corrected as shown below:

| Column | Line | |
|---|---|---|
| 5 | 36 | "$I_n$" should be "$T_n$" |
| 5 | 38 | "$T_{n11}$" should be "$T_n-1$" |
| 5 | 41 | "$E_{n11}$" should be "$E_n-1$" |
| 9 | 14 | the word "axis" occurs twice |
| 11 | 6 | "s" should be "a" |
| 11 | 48 | after "and" "end" is omitted |
| 11 | 55 | the equation should read $K_1E+K_2(\Delta E/\Delta T)$ |
| 12 | 49 | "drive-signal" should be "to generate" |

Signed and sealed this 1st day of May 1973.

(SEAL)
Attest:

EDWARD M. FLETCHER, JR.                ROBERT GOTTSCHALK
Attesting Officer                      Commissioner of Patents